(12) United States Patent
Oh et al.

(10) Patent No.: US 10,150,415 B2
(45) Date of Patent: *Dec. 11, 2018

(54) METHOD AND APPARATUS FOR DETECTING A PEDESTRIAN BY A VEHICLE DURING NIGHT DRIVING

(71) Applicant: Hyundai Motor Company, Seoul (KR)

(72) Inventors: Young Chul Oh, Gyeonggi-do (KR); Myung Seon Heo, Seoul (KR); Wan Jae Lee, Gyeonggi-do (KR); Byung Yong You, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 39 days.

This patent is subject to a terminal disclaimer.

(21) Appl. No.: 15/391,310

(22) Filed: Dec. 27, 2016

(65) Prior Publication Data

US 2017/0106798 A1    Apr. 20, 2017

Related U.S. Application Data

(63) Continuation of application No. 14/562,686, filed on Dec. 6, 2014.

(30) Foreign Application Priority Data

Aug. 25, 2014   (KR) .......................... 10-2014-0110943

(51) Int. Cl.
*B60R 1/00* (2006.01)
*H04N 5/33* (2006.01)
(Continued)

(52) U.S. Cl.
CPC ................ *B60R 1/00* (2013.01); *B60K 35/00* (2013.01); *B60R 11/04* (2013.01); *G06K 9/00369* (2013.01); *G06K 9/00805* (2013.01); *G06K 9/4604* (2013.01); *G06K 9/6201* (2013.01); *H04N 5/332* (2013.01); *H04N 7/181* (2013.01);
(Continued)

(58) Field of Classification Search
None
See application file for complete search history.

(56) References Cited

U.S. PATENT DOCUMENTS 6,327,536 B1 * 12/2001 Tsuji ..................... B60Q 9/008
340/435

FOREIGN PATENT DOCUMENTS

JP     2004-254044 A      9/2004
JP       3857698 B2      12/2006
(Continued)

*Primary Examiner* — Anand S Rao
*Assistant Examiner* — Tyler B Edwards
(74) *Attorney, Agent, or Firm* — Mintz Levin Cohn Ferris Glovsky and Popeo, P.C.; Peter F. Corless (57) ABSTRACT

A method and an apparatus for detecting a pedestrian by a vehicle during night driving are provided, in which the apparatus includes: a first camera configured to take a first image including color information of a vicinity of the vehicle during night driving; a second camera configured to take a second image including thermal distribution information of the vicinity of the vehicle; a pedestrian detector configured to detect a non-pedestrian area by using the color information from the first image and detect a pedestrian area by excluding the non-pedestrian area from the second image; and a display configured to match and display the pedestrian area on the second image.

10 Claims, 8 Drawing Sheets

(51) Int. Cl.
*B60K 35/00* (2006.01)
*G06K 9/46* (2006.01)
*B60R 11/04* (2006.01)
*G06K 9/00* (2006.01)
*G06K 9/62* (2006.01)
*H04N 7/18* (2006.01)

(52) U.S. Cl.
CPC ....... *H04N 7/188* (2013.01); *B60K 2350/106* (2013.01); *B60K 2350/1084* (2013.01); *B60K 2350/2013* (2013.01); *B60R 2300/102* (2013.01); *B60R 2300/105* (2013.01); *B60R 2300/106* (2013.01); *B60R 2300/205* (2013.01); *B60R 2300/303* (2013.01); *B60R 2300/307* (2013.01); *B60R 2300/8033* (2013.01); *B60R 2300/8053* (2013.01); *B60Y 2400/92* (2013.01)

(56) References Cited

FOREIGN PATENT DOCUMENTS

| | | | |
|---|---|---|---|
| JP | 2007-087337 A | 4/2007 |
| JP | 2007-139564 A | 6/2007 |
| JP | 2008-230358 A | 10/2008 |
| JP | 2009-301494 A | 12/2009 |
| JP | 2010-020557 A | 1/2010 |
| JP | 4611919 B2 | 1/2011 |
| JP | 2011-087006 A | 4/2011 |
| JP | 2012-164026 A | 8/2012 |
| JP | 2013-247514 A | 12/2013 |
| JP | 2014-067198 A | 4/2014 |

\* cited by examiner

METHOD AND APPARATUS FOR DETECTING A PEDESTRIAN BY A VEHICLE DURING NIGHT DRIVING

CROSS-REFERENCE TO RELATED APPLICATIONS

This application is a continuation of U.S. patent application Ser. No. 14/562,686, filed Dec. 6, 2014 which is based on and claims under 35 U.S.C. § 119(a) priority from Korean Patent Application No. 10-2014-0110943, filed on Aug. 25, 2014 in the Korean Intellectual Property Office, the disclosure of which are incorporated herein in its entirety by reference.

BACKGROUND (a) Field of the Invention

The present invention relates to a method and apparatus for detecting a pedestrian by a vehicle during night driving, in which a color image and an infrared image are obtained, and a pedestrian area is detected by excluding a non-pedestrian area from the infrared image using information of the color image.

(b) Description of the Related Art

A vehicle vision system takes a color image of the vicinity of a vehicle through a camera mounted on the vehicle and displays it. For detecting an object (a vehicle, a pedestrian, etc.), this color image ensures a certain degree of performance during the daytime, but the performance for detecting an object such as a pedestrian/animal is significantly reduced at nighttime.

In order to solve the problem, conventionally, a vehicle night vision system, which applies a far-infrared camera or a near-infrared camera, etc. taking a thermal image by using the thermal property generated from a human body, has been proposed. However, because the thermal image is detected as a black and white image, substantial information may be lost and thus erroneous detection is increased.

SUMMARY

A method and an apparatus for detecting a pedestrian by a vehicle during night driving includes obtaining a color image and an infrared image, and detecting a pedestrian area by excluding a non-pedestrian area from the infrared image using information of the color image.

According to an embodiment of the present invention, an apparatus for detecting a pedestrian by a vehicle during night driving includes: a first camera configured to take a first image including color information of a vicinity of the vehicle during night driving; a second camera configured to take a second image including thermal distribution information of the vicinity of the vehicle; a pedestrian detector configured to detect a non-pedestrian area by using the color information from the first image and detect a pedestrian area by excluding the non-pedestrian area from the second image; and a display configured to match and display the pedestrian area on the second image.

Also, the second camera is implemented by one of an infrared camera, a far-infrared camera, and a near-infrared camera.

Also, the pedestrian detector includes an image matcher configured to match the first image and the second image, a non-pedestrian area detector configured to detect the area which a color value is more than a reference value as the non-pedestrian area from the first image based on the color information of the first image, an attention area extractor configured to extract an attention area by excluding the non-pedestrian area from the second image, and a pedestrian area extractor configured to extract the pedestrian area from the attention area.

Also, the image matcher calculates a real coordinate of an object from a coordinate of the first image by using inside and outside parameters of the first camera and a real distance between a virtual starting point and the object.

Also, the image matcher calculates a corresponding coordinate of the second image corresponding to the coordinate of the first image by using the real coordinate of the object, inside and outside parameters of the second camera, and the real distance.

Also, the virtual starting point is a central point between points representing locations of the first and second cameras, in which a vertical line from starting points of the first camera and the second camera and planes of the first image and the second image meet.

An method for detecting a pedestrian by a vehicle during night driving according to an embodiment of the present invention includes the steps of: taking a first image and a second image of a vicinity of the vehicle through a first camera and a second camera, respectively, during night driving; matching the first image and the second image; detecting a non-pedestrian area by using a color information of the first image; excluding the non-pedestrian area from the second image; detecting a pedestrian area from the second image excluding the non-pedestrian area; and matching and displaying the pedestrian area on the first image.

Also, the step of matching the first image and the second image includes steps of: calculating a real coordinate of an object from a coordinate of the first image by using inside and outside parameters of the first camera and a real distance between a virtual starting point and the object, and calculating a corresponding coordinate of the second image corresponding to a coordinate of the first image by using the real coordinate of the object, inside and outside parameters of the second camera and the real distance.

Also, the virtual starting point is a central point between the points, which a vertical line from starting points of the first camera and the second camera and planes of the first image and the second image meet.

Also, the step of detecting a non-pedestrian area detects an area which a color value is more than a reference value as the non-pedestrian area from the first image.

Since the present invention obtains a color image and an infrared image and detects a pedestrian area by excluding a non-pedestrian area from the infrared image using information of the color image, the calculation amount and the probability of an erroneous detection can be reduced and thus reliable information can be provided.

Further, the present invention can be combined with the existing front camera and thus the performance is improved without any additional cost.

Further, since the present invention excludes the non-pedestrian area from the image, the existing pedestrian detection algorithm can be applied and the calculation speed of a pedestrian detection can be improved.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the embodiments of the present invention will be described in detail with reference to the drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
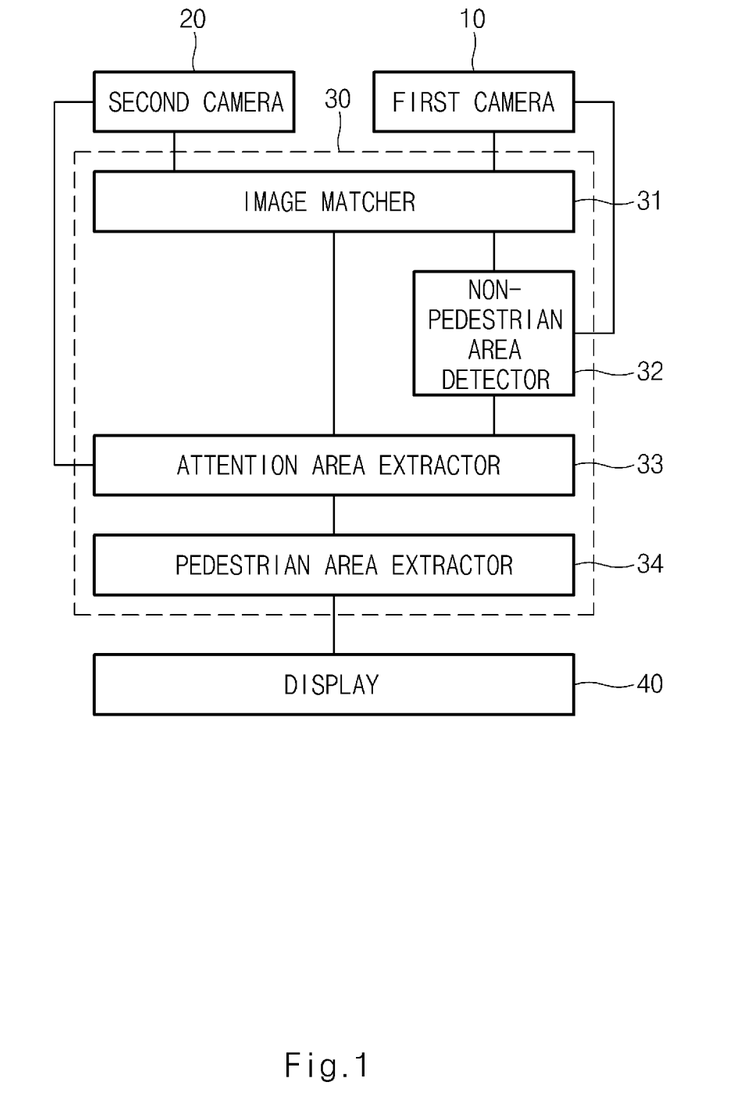
FIG. 1 is a block configuration diagram of an apparatus for detecting a pedestrian by a vehicle during night driving according to an embodiment of the present invention.
Figure 2A:
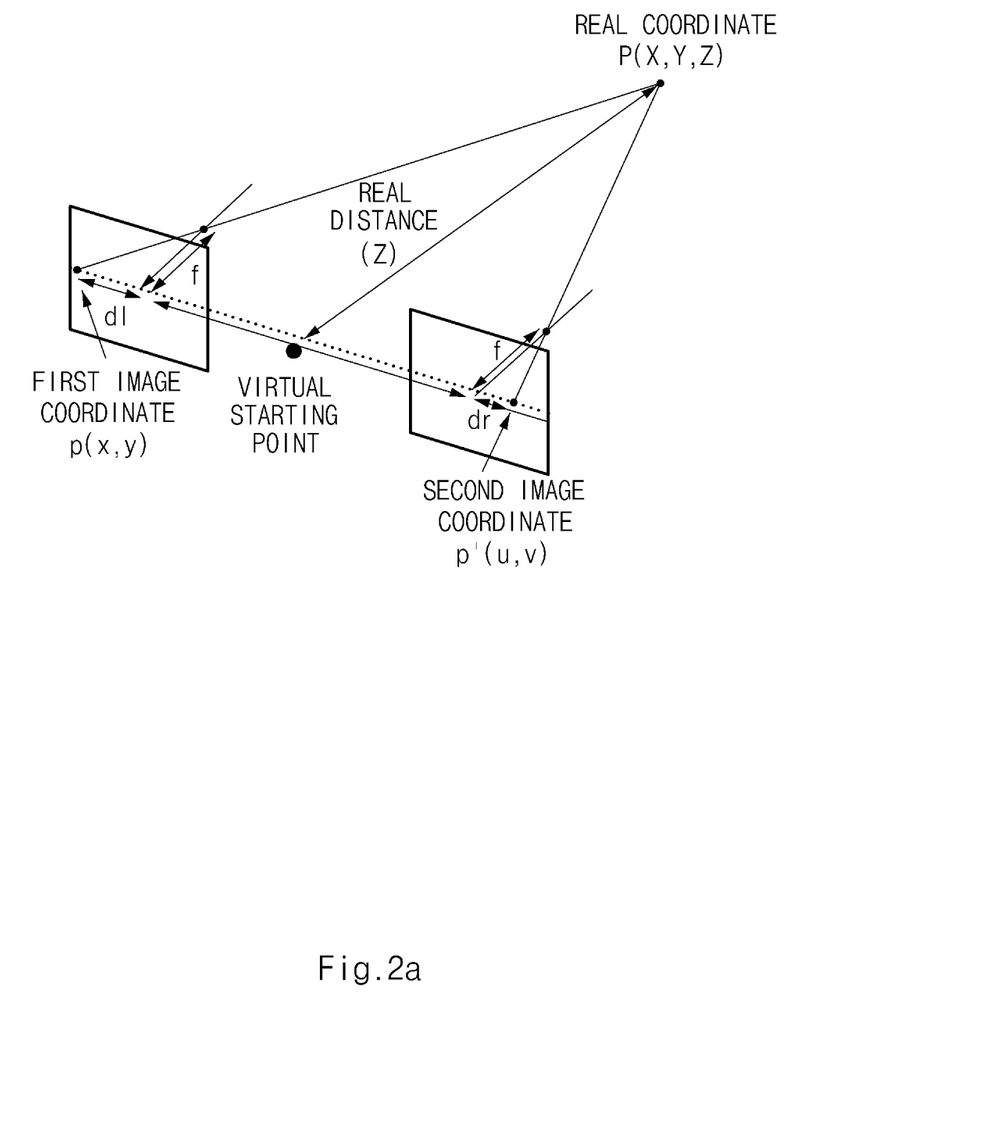
FIG. 2a is diagram showing the geometric relation between two images obtained by two cameras related to the present invention.
Figure 2B:
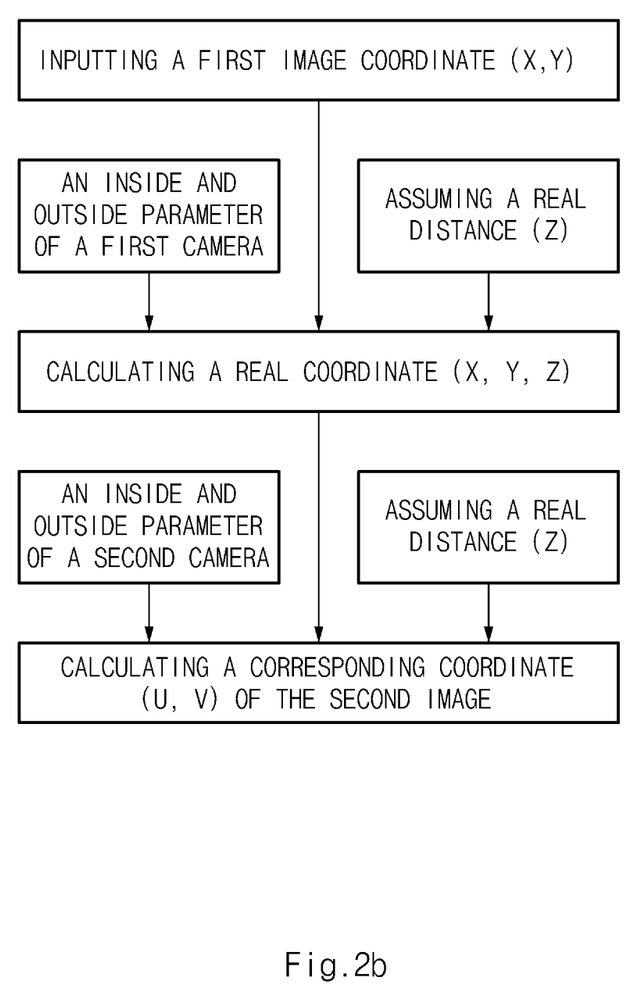
FIG. 2b is flow chart showing a process for calculating a corresponding coordinate between cameras of the image matcher shown in FIG. 1.

FIG. 1 is a block configuration diagram of an apparatus for detecting a pedestrian by a vehicle during night driving according to an embodiment of the present invention, FIG. 2a is diagram showing the geometric relation between two images obtained by two cameras related to the present invention, and FIG. 2b is flow chart showing a process for calculating a corresponding coordinate between cameras of the image matcher shown in FIG. 1.

Referring to FIG. 1, an apparatus for detecting a pedestrian according to the present invention includes a first camera 10, a second camera 20, a pedestrian detector 30 and a display 40.

The first camera 10 takes a first image including color information of the vicinity of a vehicle during night driving. The first camera 10 can be implemented by a CCD (Charge Coupled Device) camera and the like.

The second camera 20 takes a second image including thermal distribution information of the vicinity of the vehicle. The second camera 20 can be implemented by an infrared camera, a far-infrared camera, a near-infrared camera, and the like.

The first camera 10 and the second camera 20 are mounted in pairs on at least one of the front, rear, and side of the vehicle. The first camera 10 and second camera 20 are arranged in two different points of the same plane (for example, front). In particular, the first camera 10 and the second camera 20 obtain the image of the same scene from the different points from each other.

The pedestrian detector 30 detects a non-pedestrian area from the first image and detects the pedestrian area by excluding the non-pedestrian area from the second image. This pedestrian detector 30 can be implemented by an image processor.

The pedestrian detector 30 includes an image matcher 31, a non-pedestrian area detector 32, an attention area extractor 33, and a pedestrian area extractor 34.

The image matcher 31 matches the first image and the second image by using viewpoint change technology. In other words, the image matcher 31 mutually matches the coordinates of the first image and the second image obtained from the different points from each other.

The process which the image matcher 31 calculates the corresponding coordinates between the first image and the second image will be described with reference to FIG. 2a and FIG. 2b.

Referring to FIG. 2a, one point P in the three dimensional space is projected onto an image coordinate p in the first image, and is projected onto an image coordinate p' in the second image. Also, a central point between the points, in which a vertical line from the starting points of two cameras and the planes of the first image and the second image meet, is assumed as a virtual starting point, and the distance from the virtual starting point to the point P is assumed as a real distance Z.

If the image coordinate p of the first image is inputted, in order to calculate the image coordinate of the corresponding p' in the second image, if the image coordinate p(x, y) of the first image is inputted, the image matcher 31 calculates the real coordinate (X, Y, Z) of the point P by using the inside and outside parameter of the first camera 10 and the real distance Z.

The image matcher 31 calculates the image coordinate p'(u, v) of the second image corresponding to the image coordinate p(x, y) of the first image by using the real coordinate (X, Y, Z) of the point P, the inside and outside parameter of the second camera 10, and the real distance Z.

The non-pedestrian detector 32 detects the non-pedestrian area from the first image by using the color information (hue information) of the first image. At this time, the non-pedestrian area detector 32 detects the area which the color value is more than the reference value from the first image as the non-pedestrian area.

The attention area extractor 33 excludes the non-pedestrian area detected by the non-pedestrian area detector 32 from the second image. In particular, the second image excluding the non-pedestrian area becomes the attention area capable of detecting the pedestrian area.

The pedestrian area extractor 34 extracts the pedestrian area from the second image excluding the non-pedestrian area. At this time, the pedestrian area extractor 34 extracts the pedestrian area from the second image by using a feature detection and learning algorithm (a pedestrian detection algorithm).

The display 40 matches and displays the pedestrian area extracted by the pedestrian are extractor 34 on the second image. This display 40 can be implemented by LCD (Liquid Crystal Display), LED (Light Emitting Diode) display, HUD (Head-Up Display), a transparent display and the like.

Figure 3:
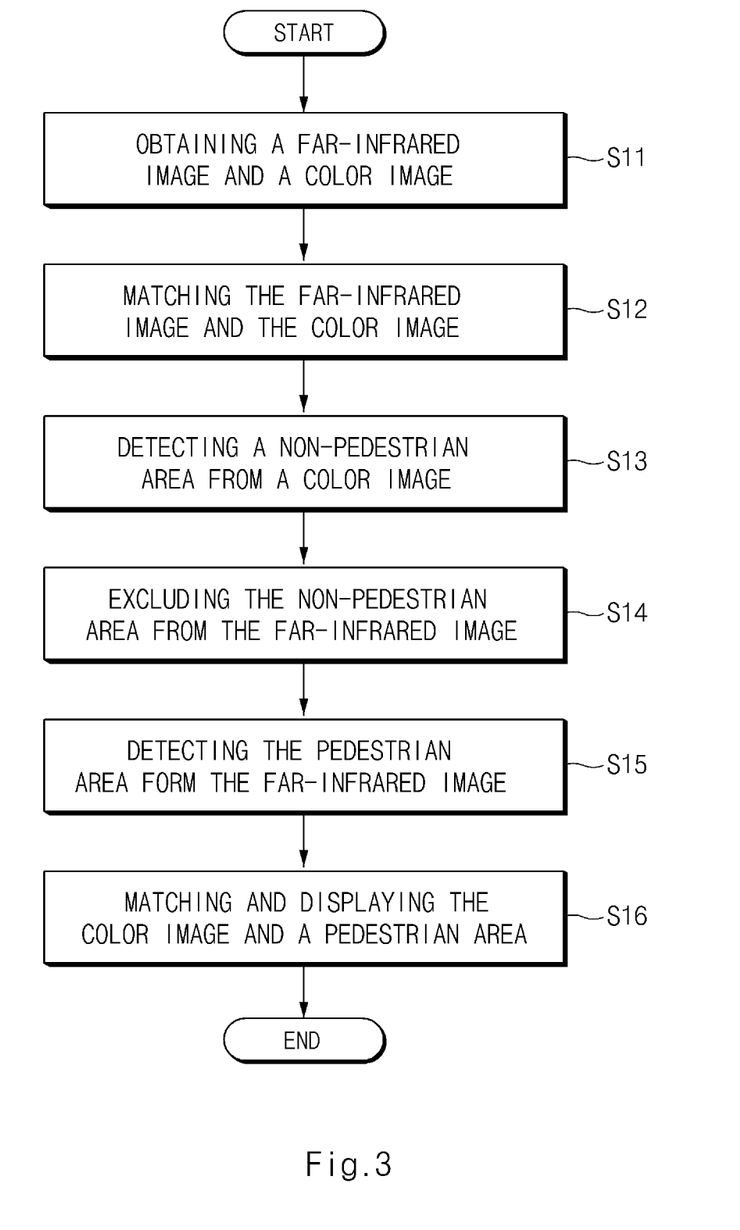
FIG. 3 is a flow chart showing a method for detecting a pedestrian by a vehicle during night driving according to an embodiment of the present invention.

FIG. 3 is a flow chart showing a method for detecting a pedestrian by a vehicle during night driving according to an embodiment of the present invention, and FIG. 4a to FIG. 4d are exemplary diagrams showing the image processing result for each of steps of a night pedestrian detection process.

First, the pedestrian detector 30 of a pedestrian detection apparatus takes the first image and the second image of the vicinity (for example, front, rear, or side) of a vehicle through the first camera 10 and the second camera 20 during night driving (S11). At this time, the first image and the second image is the images taken in the different points from each other, the first image (color image) includes the color information for the vicinity of a vehicle, and the second image includes the thermal distribution information for the vicinity of a vehicle.

The image matcher 31 of the pedestrian detector 30 matches the image coordinate of the second image corresponding to the image coordinate of the first image (S12). In other words, the image matcher 31 calculates the real coordinate of the object from the coordinate of the first image by using the inside and the outside parameter of the first camera 10 and the real distance between the virtual starting point and the object, and calculates the corresponding coordinate of the second image corresponding to the coordinate of the first image by using the real coordinate of the object, the inside and the outside parameter of the second camera 20 and the real distance.

Figure 4A:
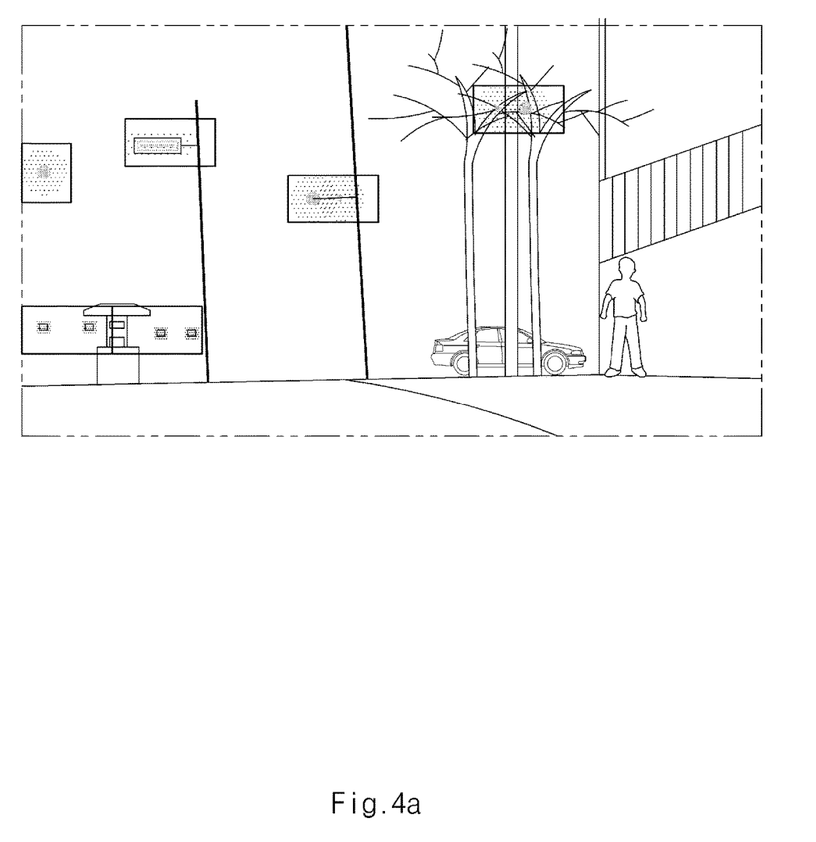
FIG. 4a to FIG. 4d are exemplary diagrams showing the image processing result for each of steps of a night pedestrian detection process.

The non-pedestrian detector 32 detects the non-pedestrian area form the first image by using the color information of the first image (S13). At this time, the non-pedestrian area detector 32 detects the area which the color value is more than the reference value as the non-pedestrian area in the first image. In particular, the non-pedestrian detector 32 detects the bright area which is more than the reference as compared to the vicinity as the non-pedestrian area as shown in FIG. 4a.

Figure 4B:
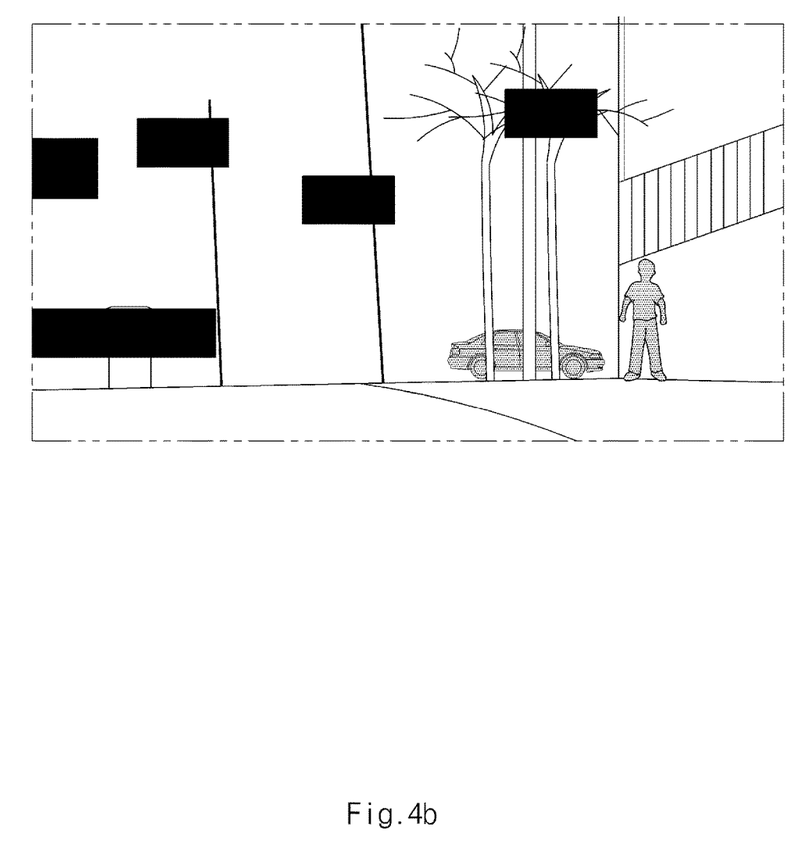

The attention area extractor 33 excludes the non-pedestrian area from the second image (S14). For example, the attention area extractor 33 detects the area of the far-infrared area corresponding to the non-pedestrian area detected form the color image and deletes the area as shown in FIG. 4b.

Figure 4C:
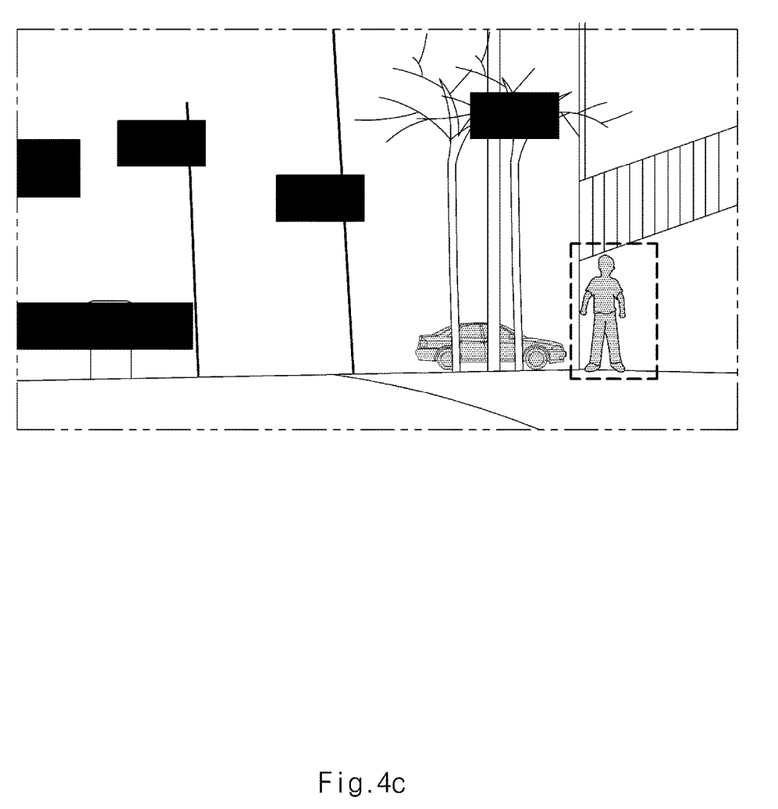

The pedestrian area extractor 34 detects the pedestrian area form the second image excluding the non-pedestrian area (S15). Here, the pedestrian area extractor 34 detects the pedestrian area in the far-infrared area excluding the non-pedestrian area by using a feature detection and learning algorithm (pedestrian detection algorithm) as shown in FIG. 4c.

Figure 4D:
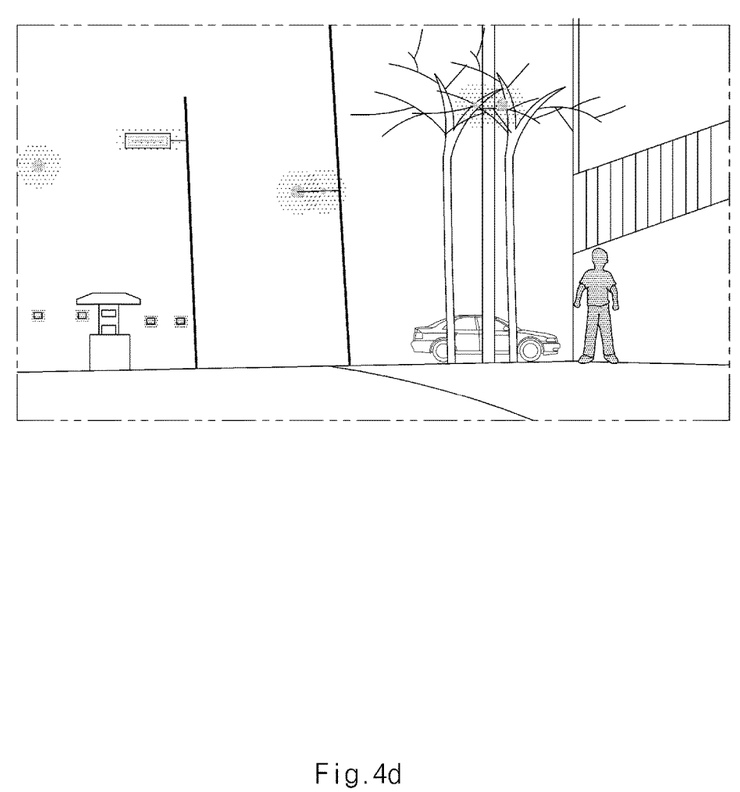

The display 40 matches and displays the pedestrian area detected by the pedestrian detector 30 on the first image (S16). For example, the display 40 matches and displays the pedestrian area detected from the far-infrared image on the color image as shown in FIG. 4d. Although the present invention has been described through specific exemplary embodiments hereinabove, it may be variously modified without departing from the scope of the present invention. Accordingly, the scope of the present invention is not to be construed as being limited to the above-mentioned exemplary embodiments, but is to be defined by the following claims and equivalents thereto. When considering the above-mentioned contents, it is to be considered that the present invention includes modifications and alternations thereof as long as these modifications and alternations are within the scope of the following claims and equivalents thereto.

What is claimed is:

1. An apparatus for detecting a pedestrian by a vehicle during night driving, comprising:
   a first camera configured to take a first image including color information of a vicinity of the vehicle during night driving;
   a second camera configured to take a second image including thermal distribution information of the vicinity of the vehicle;
   a pedestrian detector configured to detect a non-pedestrian area by using the color information from the first image and detect a pedestrian area by excluding the non-pedestrian area from the second image; and
   a display configured to match and display the pedestrian area on the second image,
   wherein the pedestrian detector comprises:
      an image matcher configured to match the first image and the second image by matching corresponding coordinates of the first image and the second image;
      a non-pedestrian area detector configured to detect an area in which a color value is more than a reference value as the non-pedestrian area from the first image based on the color information of the first image; and
      an attention area extractor configured to extract an attention area by excluding the non-pedestrian area from the second image.

2. The apparatus of claim 1, wherein the pedestrian detector further comprises a pedestrian area extractor configured to extract the pedestrian area from the attention area.

3. The apparatus of claim 1, wherein the first camera includes one or more of an infrared camera, a far-infrared camera, and near-infrared camera.

4. The apparatus of claim 1, wherein the image matcher calculates a real coordinate of an object from a coordinate of the first image by using inside and outside parameters of the first camera and a real distance between a virtual starting point and the object.

5. The apparatus of claim 4, wherein the virtual starting point is a central point between points representing locations of the first and second cameras, in which a vertical line from the points of the first camera and the second camera and planes of the first image and the second image meet.

6. The apparatus of claim 2, wherein the image matcher calculates a corresponding coordinate of the second image corresponding to the coordinate of the first image by using the real coordinate of the object, inside and outside parameters of the second camera, and the real distance.

7. A method for detecting a pedestrian by a vehicle during night driving, comprising:
   taking a first image and a second image of a vicinity of the vehicle through a first camera and a second camera, respectively, during night driving;
   matching the first image and the second image by matching corresponding coordinates of the first image and the second image;

detecting a non-pedestrian area by using color information of the first image;
excluding the non-pedestrian area from the second image;
detecting a pedestrian area from the second image excluding the non-pedestrian area; and
matching and displaying the pedestrian area on the first image,
wherein the detecting the non-pedestrian area includes detecting an area in which a color value is more than a reference value as the non-pedestrian area from the first image.

8. The method according to claim 7, wherein the matching the first image and the second image comprises calculating a real coordinate of an object from a coordinate of the first image by using inside and outside parameters of the first camera and a real distance between a virtual starting point and the object.

9. The method according to claim 8, wherein the matching the first image and the second image further comprises calculating a corresponding coordinate of the second image corresponding to the coordinate of the first image by using a real coordinate of the object, inside and outside parameters of the second camera, and the real distance.

10. The method according to claim 8, wherein the virtual starting point is a central point between points representing locations of the first and second cameras, in which a vertical line from starting points of the first camera and the second camera and planes of the first image and the second image meet.

* * * * *